United States Patent
Wang et al.

(10) Patent No.: US 11,140,658 B2
(45) Date of Patent: Oct. 5, 2021

(54) METHOD FOR INFORMATION TRANSMITTING, RECEIVING AND CONTROLLING, TRANSMITTING DEVICE, RECEIVING DEVICE AND BASE STATION

(71) Applicant: NTT DOCOMO INC., Tokyo (JP)

(72) Inventors: Huan Wang, Beijing (CN); Liu Liu, Beijing (CN); Qin Mu, Beijing (CN); Qun Zhao, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/324,084

(22) PCT Filed: Aug. 9, 2017

(86) PCT No.: PCT/CN2017/096531
§ 371 (c)(1),
(2) Date: Feb. 7, 2019

(87) PCT Pub. No.: WO2018/028586
PCT Pub. Date: Feb. 15, 2018

(65) Prior Publication Data
US 2019/0174461 A1   Jun. 6, 2019

(30) Foreign Application Priority Data
Aug. 11, 2016 (CN) .......................... 201610656643.0

(51) Int. Cl.
*H04W 4/00* (2018.01)
*H04W 72/00* (2009.01)
(Continued)

(52) U.S. Cl.
CPC .......... *H04W 72/005* (2013.01); *H04W 4/06* (2013.01); *H04W 4/70* (2018.02); *H04W 4/80* (2018.02);
(Continued)

(58) Field of Classification Search
USPC .... 370/229, 230, 230.1, 236, 252, 328, 329, 370/330, 389, 390, 392, 432
See application file for complete search history.

(56) References Cited

U.S. PATENT DOCUMENTS

2007/0171927 A1* 7/2007 Paik ...................... H04L 49/201
370/402
2015/0215903 A1 7/2015 Zhao et al.
(Continued)

FOREIGN PATENT DOCUMENTS

CN 103974198 A 8/2014
WO 2015142900 A1 9/2015
(Continued)

OTHER PUBLICATIONS

Samsung, R1-143076 Control Information Needed for D2D Broadcast Communication, 3GPP TSG RAN WGI Meeting #78, Aug. 22, 2014 (Aug. 22, 2014), sections 1-3.
(Continued)

*Primary Examiner* — Nguyen H Ngo
(74) *Attorney, Agent, or Firm* — Osha Bergman Watanabe & Burton LLP

(57) ABSTRACT

Embodiments of the present invention provide a method for information transmitting, receiving and controlling, a transmitting device, a receiving device, and a base station. An information transmitting method according to an embodiment of the present invention is performed by the transmitting device, the transmitting device transmits information to a receiving device by using resource block in a resource pool which includes a plurality of resource blocks, and the information transmitting method includes: determining an information transmitting manner; transmitting scheduling information for one unicast transmission by using single resource block of the plurality of resource blocks when the information transmitting manner is unicast; transmitting
(Continued)

scheduling information for one multicast or broadcast transmission by using a resource block pair of the plurality of resource blocks when the information transmitting manner is multicast or broadcast.

6 Claims, 6 Drawing Sheets

(51) Int. Cl.
   *H04W 4/70* (2018.01)
   *H04W 4/80* (2018.01)
   *H04W 4/06* (2009.01)
   *H04W 72/12* (2009.01)

(52) U.S. Cl.
   CPC ....... *H04W 72/00* (2013.01); *H04W 72/1278* (2013.01); *Y02D 30/70* (2020.08)

(56) References Cited

U.S. PATENT DOCUMENTS

| | | | | |
|---|---|---|---|---|
| 2016/0037572 | A1* | 2/2016 | Yeh | H04W 72/0406 370/329 |
| 2016/0192427 | A1* | 6/2016 | Yun | H04W 76/14 370/329 |
| 2017/0230937 | A1* | 8/2017 | Nguyen | H04W 72/0406 |
| 2017/0295601 | A1* | 10/2017 | Kim | H04W 72/0406 |
| 2018/0054693 | A1* | 2/2018 | Agiwal | H04W 80/02 |
| 2018/0132136 | A1* | 5/2018 | Lu | H04W 72/1263 |
| 2019/0159216 | A1* | 5/2019 | Sun | H04L 1/1614 |

FOREIGN PATENT DOCUMENTS

| | | |
|---|---|---|
| WO | WO-2015199353 A1 | 12/2015 |
| WO | WO-2016028059 A1 | 2/2016 |

OTHER PUBLICATIONS

International Search Report for PCT/CN2017/096531, ISA/CN, Haidian District, Beijing, dated Oct. 26, 2017, with English translation attached.

Ericsson, "On scheduling assignments", 3GPP Draft, R1-142400 on Scheduling Assignments, 3rd Generation Partnership Project, Mobile Competence Centre, 650, Route Des Lucioles, F-06921 Sophia-Antipolis Cedex, France, vol. RAN WG1, Seoul, South Korea, May 19, 2014-May 23, 2014, May 18, 2014.

Extended European Search Report regarding EP178387163, dated Nov. 22, 2019.

Written Opinion regarding PCT/CN2017/096531, dated Oct. 26, 2017.

3GPP TSG-RAN WG1 Meeting #78; R1-143373 "On resource grants for D2D communication" Ericsson; Dresden, Germany; Aug. 18-22, 2014 (5 pages).

Office Action issued in Japanese Application No. 2019-507113; dated Jun. 8, 2021 (8 pages).

* cited by examiner

METHOD FOR INFORMATION TRANSMITTING, RECEIVING AND CONTROLLING, TRANSMITTING DEVICE, RECEIVING DEVICE AND BASE STATION

CROSS-REFERENCE TO RELATED APPLICATIONS

This application is a 371 U.S. National Stage of International Application No. PCT/CN2017/096531, filed on Aug. 9, 2017, which claims priority to Chinese Application No. 201610656643.0, filed on Aug. 11, 2016. The entire disclosures of the above applications are incorporated herein by reference.

TECHNICAL FIELD

The present invention relates to a field of wireless communication, and particularly relates to a method for information transmitting, receiving and controlling that can be used in a wireless communication system, and the corresponding transmitting device, receiving device and base station.

BACKGROUND

Cellular-based Narrow Band Internet of Things (NB-IoT) is an emerging technology which can be widely used worldwide. It supports cellular data connection of low-power devices in WAN and can be deployed directly on GSM network, UMTS network or LTE network, with the characteristics of wide coverage, multiple connections, low data rate, low cost, low power consumption and excellent architecture.

In NB-IoT, in order to increase the coverage of the network, a time slot bundling (TTI bundling) technology can be adopted. The TTI bundling technology is a technology in which a base station repeatedly transmits a data packet on a plurality of consecutive Transmission Time Interval (TTI) resources, so that a receiving device combines data on the plurality of TTI resources in order to receive the data. The TTI bundling technology in NB-IoT can effectively improve the transmission quality and expand the coverage.

However, the TTI bundling technology requires the user equipment kept in powered on state for a long time to ensure the integrity of the data packet transmission during information transmission, thereby causing high power consumption of the user equipment and waste of resources.

SUMMARY

According to one aspect of the present invention, an information transmitting method performed by an transmitting device is provided, wherein the transmitting device transmits information to a receiving device by using resource block in a resource pool that includes a plurality of resource blocks, and the method includes: determining an information transmitting manner; transmitting scheduling information for one unicast transmission by using single resource block among the plurality of resource blocks when the information transmitting manner is unicast; transmitting scheduling information for one multicast or broadcast transmission by using one resource block pair of the plurality of resource blocks when the information transmitting manner is multicast or broadcast.

According to another aspect of the present invention, an information receiving method performed by a receiving device is provided, wherein the receiving device receives scheduling information transmitted by a transmitting device by using resource block in a resource pool that includes a plurality of resource blocks, and the scheduling information is transmitted via one resource block or resource block pair of the plurality of resource blocks, the resource block pair including an initial position resource block and a repeated position resource block, the method includes: decoding the scheduling information received via the initial position resource block of the one resource block pair; decoding the scheduling information received via the repeated position resource block regardless of whether the scheduling information of the initial position resource block is successfully decoded or not.

According to still another aspect of the present invention, an information receiving method performed by a receiving device is provided, wherein the receiving device receives information transmitted by a transmitting device by using resource block in a resource pool that includes a plurality of resource blocks, and the scheduling information is transmitted via one resource block or resource block pair of the plurality of resource blocks, the resource block pair including an initial position resource block and a repeated position resource block, the method includes: decoding the scheduling information received via the initial position resource block of the one resource block pair; determining an information transmitting manner of the transmitting device; determining whether to decode the scheduling information received via the repeated position resource block or not according to the information transmitting manner of the transmitting device and a scheduling information decoding result of the initial position resource block.

According to a further aspect of the present invention, an information transmitting control method for controlling a transmitting device to transmit information by using resource block in a resource pool is provided, the resource pool includes a plurality of resource blocks, wherein the method includes: determining an information transmitting manner of the transmitting device; indicating the transmitting device to transmit scheduling information according to the determined information transmitting manner, in order to cause the transmitting device to transmit the scheduling information for one unicast transmission by using single resource block of the plurality of resource blocks when the information transmitting manner is unicast, or to cause the transmitting device to transmit the scheduling information for one multicast or broadcast transmission by using one resource block pair of the plurality of resource blocks when the information transmitting manner is multicast or broadcast.

According to still another aspect of the present invention, a transmitting device for transmitting information to a receiving device by using resource block in a resource pool is provided, the resource pool includes a plurality of resource blocks, wherein the transmitting device includes: a determining unit configured to determine an information transmitting manner; a transmitting unit configured to transmit scheduling information for one unicast transmission by using a single resource block of the plurality of resource blocks when the information transmitting manner is unicast, and configured to transmit scheduling information for one multicast or broadcast transmission by using one resource block pair of the plurality of resource blocks when the information transmitting manner is multicast or broadcast.

According to another aspect of the present invention, a receiving device for receiving scheduling information transmitted by a transmitting device by using resource block in a resource pool is provided, the resource pool includes a plurality of resource blocks, and the scheduling information is transmitted via one resource block or resource block pair of the plurality of resource blocks, the resource block pair including an initial position resource block and a repeated position resource block, wherein the receiving device includes: a first initial position decoding unit configured to decode the scheduling information received via the initial position resource block of the one resource block pair; a first repeated position decoding unit configured to decode the scheduling information received via the repeated position resource block regardless of whether the scheduling information of the initial position resource block is successfully decoded or not.

According to still another aspect of the present invention, a receiving device for receiving information transmitted by a transmitting device by using resource block in a resource pool is provided, the resource pool includes a plurality of resource blocks, and the scheduling information is transmitted via one resource block or resource block pair of the plurality of resource blocks, the resource block pair including an initial position resource block and a repeated position resource block, wherein the receiving device includes: a second initial position decoding unit configured to decode the scheduling information received via the initial position resource block of the one resource block pair; a determining unit configured to determine an information transmitting manner of the transmitting device; a second repeated position decoding unit configured to determine whether to decode the scheduling information received via the repeated position resource block or not according to the information transmitting manner of the transmitting device and a scheduling information decoding result of the initial position resource block.

According to a further aspect of the present invention, a base station for controlling a transmitting device to transmit information by using resource block in a resource pool is provided, the resource pool includes a plurality of resource blocks, wherein the base station includes: a determining unit configured to determine an information transmitting manner of the transmitting device; a indicating unit configured to indicate the transmitting device to transmit scheduling information according to the determined information transmitting manner, in order to cause the transmitting device to transmit the scheduling information for one unicast transmission by using single resource block of the plurality of resource blocks when the information transmitting manner is unicast, or to cause the transmitting device to transmit the scheduling information for one multicast or broadcast transmission by using one resource block pair of the plurality of resource blocks when the information transmitting manner is multicast or broadcast.

With a method for information transmitting, receiving and controlling, and the corresponding transmitting device, receiving device and base station according to the above aspects of the present invention, it is possible to use a transmission manner of device-to-device (D2D) transmitting for conducting information transmission in NB-IoT instead of the TTI bundling technology. By utilizing the characteristics of large unicast transmission in a relay system, the present invention improves the transmitting manner of SA accordingly, thereby further reducing the long period of power-on state of a user equipment for listening to a SA resource pool to receive data packets, reducing the power consumption of the user equipment, and improving the efficiency of resource utilization.

BRIEF DESCRIPTION OF THE DRAWINGS

The foregoing and other objects, features and advantages of the present invention will become more apparent from the detailed description of the embodiments of the present invention in conjunction with the accompanying drawings, wherein.

DETAILED DESCRIPTION

A method for information transmitting, receiving and controlling and the corresponding transmitting device, receiving device and base station according to embodiments of the present invention will be described below with reference to accompanying drawings. In the accompanying drawings, same reference numbers always refer to same elements. It should be understood that the embodiments described herein are merely illustrative, and shall not to be construed as limiting a scope of the present invention.

In the present invention, in order to solve the problem of power consumption and resource waste caused by a TTI bundling technology adopted in a NB-IoT system, the inventor considers using a D2D relay transmission method for information transmissions in the NB-IoT system, instead of the TTI bundling technology, to reduce power consumption and improve resource utilization efficiency.

Figure 1:
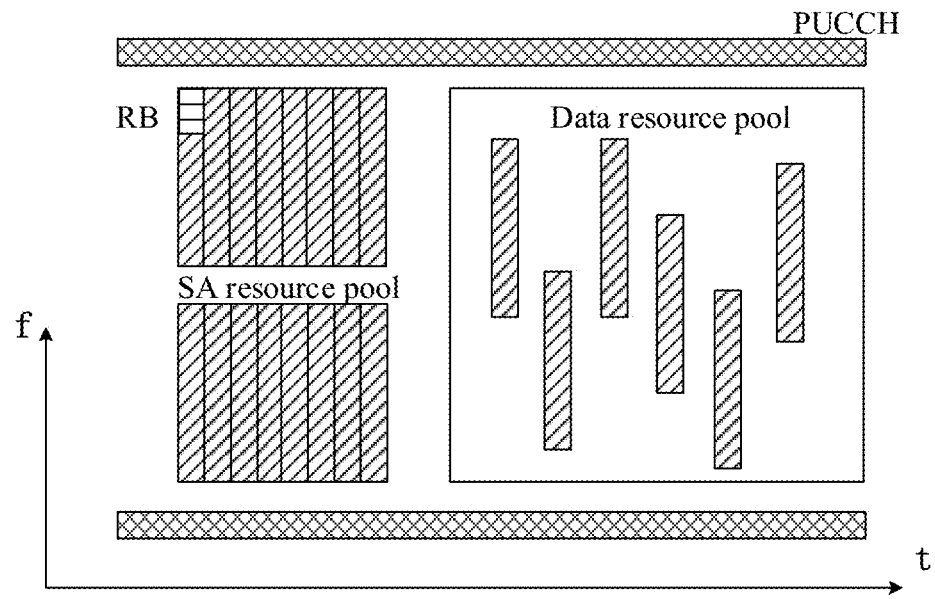
FIG. 1 shows a schematic diagram of resource pool allocation of a D2D system.

A D2D system supports information transmissions between a relay device and a user equipment, and information transmissions between user equipments, which utilizes resource blocks in a resource pool for resource allocation and information transmissions. FIG. 1 is a schematic diagram of resource pool allocation of the D2D system. As shown in FIG. 1, radio communication resources in a physical uplink control channel (PUCCH) are allocated as a scheduling assignment (SA) resource pool and a data resource pool, where SA is the control information allocated for scheduling, and is used to indicate resource positions of data resource blocks in the data resource pool associated therewith. The SA may have a fixed size, that is, 1 resource block (RB) and 1 subframe. In the D2D system, information transmissions between nearby user equipments in multicast or broadcast transmission is realized by SA resource blocks and data resource blocks.

Figure 2:
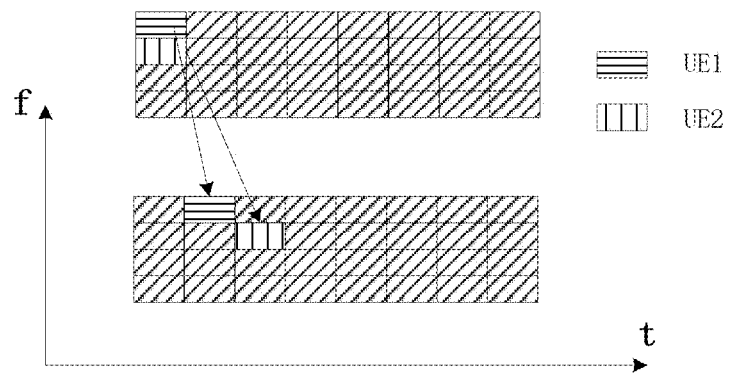
FIG. 2 shows a schematic diagram of allocation of SA resource block pairs.

In addition, due to the existence of Half Duplex (HD) problem, that is, the transmitted data can be transmitted in two directions of one channel, but cannot be transmitted at the same time, thus, generally in the D2D system, the manner of SA repeated transmission is adopted to avoid the HD problem. That is to say, in a multicast or broadcast information transmitting manner, the same scheduling information is repeatedly transmitted by using one SA resource block pair. The SA resource block pair is composed of an SA resource block in an upper part of a SA resource pool and an SA resource block in a lower part of the SA resource pool with a specific correspondence relationship therewith, and can be expressed as an initial position resource block and a repeated position resource block. FIG. 2 is a schematic diagram of allocation of SA resource block pairs for information transmissions of UE1 and UE2 respectively. As shown in FIG. 2, for UE1, a resource block pair is composed of an SA resource block in an upper part of a SA resource pool and an SA resource block in a lower part of the corresponding SA resource pool (indicated by the arrow) for information transmissions of UE1. On this resource block pair, each SA resource block transmits the same scheduling information for UE1 respectively. The SA resource block allocation manner and the scheduling information transmitting manner of UE2 are also in the similar manner.

Figure 3:
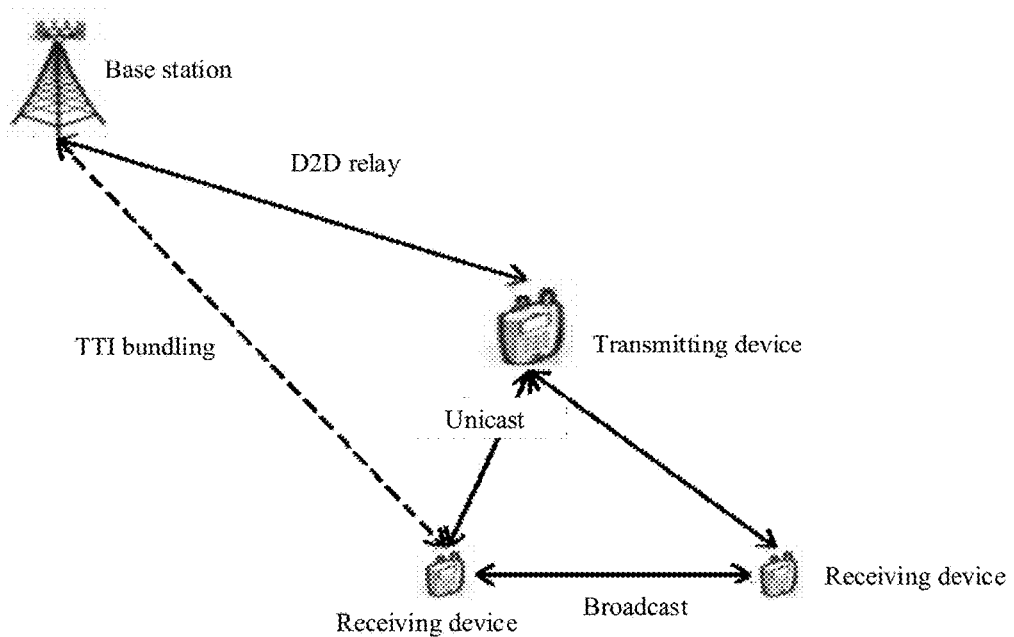
FIG. 3 shows a schematic diagram of using a D2D transmission instead of a TTI bundling technology according to an embodiment of the present invention.

FIG. 3 is a schematic diagram of using a D2D relay transmission instead of the TTI bundling technology in a NB-IoT system according to an embodiment of the present invention. The dotted line in FIG. 3 indicates TTI bundling information transmissions from a base station to a receiving device used in the NB-IoT system in the prior art, and the solid line indicates a D2D relay transmission technology adopted by a transmitting device in the embodiment of the present invention. Wherein, unlike the prior art, unicast communication is a typical information transmission manner in the NB-IoT system. In the NB-IoT system, transmitting and receiving capability of user equipments are also limited. When user equipments transmit information, some of them can transmit information on a plurality of subcarriers or even on entire PRB, but some user equipments can only transmit information on a single subcarrier. When receiving information, user equipments can receive information on an entire PRB. Therefore, a D2D transmitting technology in the NB-IoT system needs to satisfy the transmission requirements of a unicast single subcarrier of information at the same time.

In order to satisfy the transmission requirements of the unicast single subcarrier for the D2D transmitting technology in the NB-IoT system, the present invention proposes the following specific embodiments.

Figure 4:
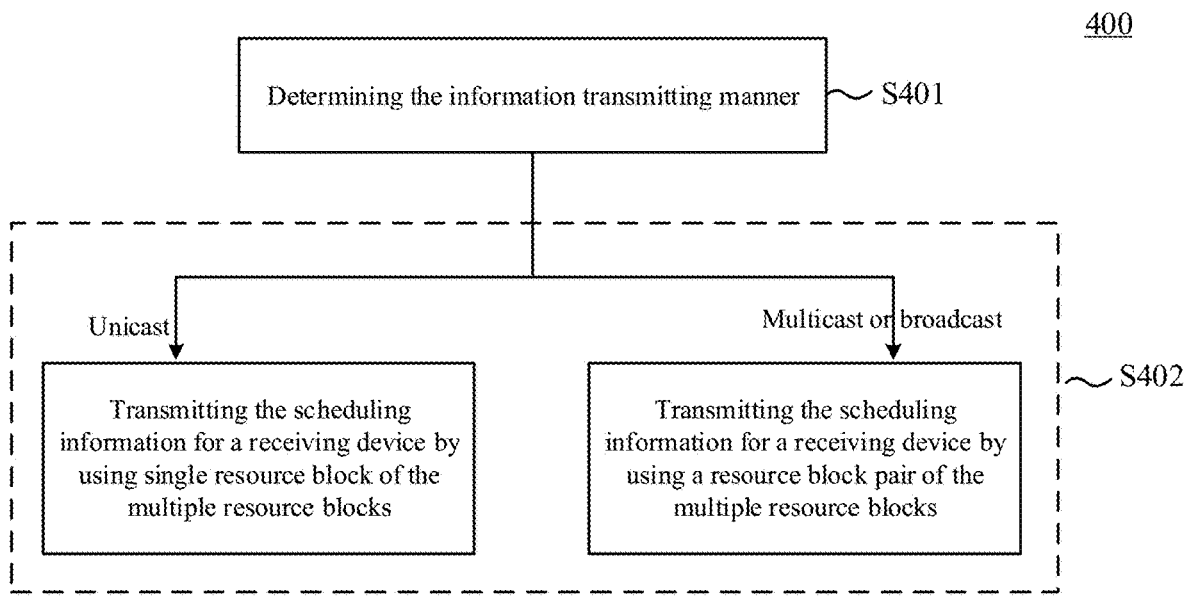
FIG. 4 shows a flow chart of an information transmitting method according to an embodiment of the present invention.

First, an information transmitting method performed by a transmitting device according to an embodiment of the present invention will be described with reference to FIG. 4. FIG. 4 shows a flow chart of an information transmitting method 400. The transmitting device transmits information to a receiving device by using resource block in a resource pool that includes a plurality of resource blocks. According to the embodiment of the present invention, when the transmitting device transmits information, the transmitting device first needs to determine whether an information transmitting manner is unicast or multicast or broadcast according to an indication of a base station, and then transmits information according to the determined information transmitting manner.

As shown in FIG. 4, in step S401, the information transmitting manner is determined. The information transmitting manner of the transmitting device is indicated by the base station, and the information transmitting manner may include unicast, multicast, and broadcast. According to an example of the present invention, the base station can directly designate the information transmitting manner of the transmitting device by transmitting an indication. According to another example of the present invention, the transmitting device may first transmit a Scheduling Request (SR) containing the information transmitting manner of the transmitting device to the base station, and then the base station may indicate the information transmitting manner of the transmitting device according to the SR. For example, when the information transmitting manner of the transmitting device is unicast, the SR transmitted from the transmitting device to the base station may include information on which the information transmitting manner is unicast, so that the base station indicates the transmitting device to transmit scheduling information to the receiving device in a unicast manner.

The indication of the information transmitting manner of the base station obtained by the transmitting device can be performed in various ways. In an embodiment of the present invention, the base station may first transmit configuration information for the information transmitting manner to the transmitting device, so that the transmitting device determines the information transmitting manner according to this configuration information. For example, the base station may first transmit a semi-static configuration of a unicast transmitting manner to the transmitting device, so that the transmitting device transmits information to the receiving device by using the unicast transmitting manner for a period of time thereafter. In another embodiment of the present invention, the base station may transmit D2D authorization information to the transmitting device so as to authorize the transmitting device to transmit information via D2D to the receiving device, where the authorization information may include a 1-bit indication information indicating the information transmitting manner of the transmitting device. In still another embodiment of the present invention, the transmitting device may further determine its information transmitting manner implicitly. Specifically, the transmitting device may determine its information transmitting manner through the receiving device information indicating the receiving device in the received base station D2D authorization information, in combination with the pre-stored information receiving manner corresponding to the receiving device. For example, when the receiving device information received by the transmitting device corresponds to a unicast receiving manner, the transmitting device may determine its information transmitting manner as a unicast transmitting manner.

In step S402, when the information transmitting manner is unicast, the scheduling information for one unicast transmission is transmitted by using one resource block of the plurality of resource blocks; when the information transmitting manner is multicast or broadcast, the scheduling information for one multicast or broadcast transmission is transmitted by using a resource block pair of the plurality of resource blocks.

Figure 5:
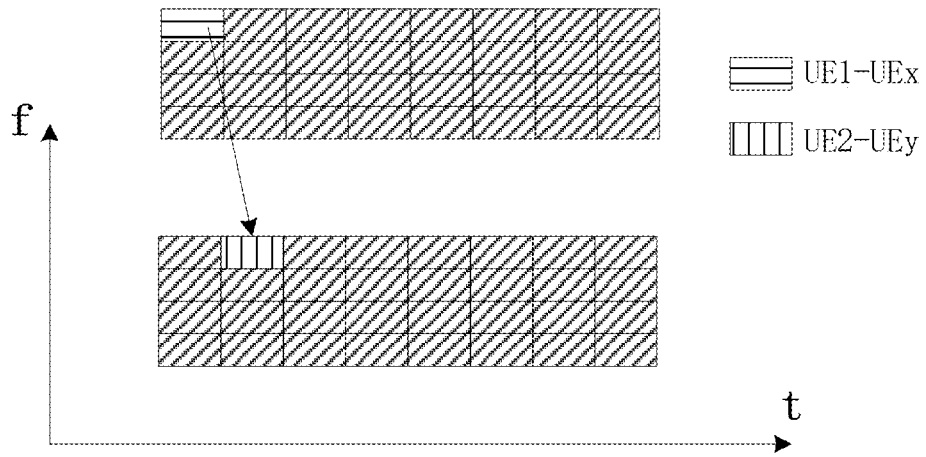
FIG. 5 shows a schematic diagram of allocation of SA resource blocks in a unicast transmitting manner.

In this step, when the information transmitting manner of the transmitting device is multicast or broadcast, a SA resource block pair in a resource pool can be used to repeatedly transmit the scheduling information for the same transmission by referring to the SA configuration shown in FIG. 2 to avoid the HD problem. When the information transmitting manner of the transmitting device is unicast, the scheduling information is not required to be repeatedly transmitted by using a resource block pair, but the scheduling information for one unicast transmission is transmitted on single SA resource block. FIG. 5 shows a schematic diagram of allocation of SA resource blocks in a unicast transmitting manner. As shown in FIG. 5, unicast information transmissions from different transmitting devices to different receiving devices may be respectively carried on two corresponding SA resource blocks of one resource block pair indicated by the arrow, for example, unicast information transmissions from UE1 to UEx and unicast information transmissions from UE2 to UEy may be carried.

Here, in order to reuse a resource pool structure in a D2D transmission and adapt to a unicast information transmission manner in the NB-IoT system, the format of a SA resource block needs to be reconfigured by the base station or a preset protocol before the information transmissions. Specifically, the SA resource block in an embodiment of the present invention may have a fixed bandwidth of a single carrier width (15 kHz or 3.75 kHz) in frequency domain, and preferably 15 kHz which causes less HD problem, to adapt to the transmission capability of a single carrier UE. In time domain, the SA resource block may have a preset fixed time slot length, such as X*8 ms or X*32 ms, to accommodate the content of SA, where X is a fixed value.

Where in an embodiment of the present invention, the scheduling information transmitted by the transmitting device may include indication information indicating the information transmitting manner, so that the receiving device can acquire the information transmitting manner of the transmitting device. Alternatively, the indication information may occupy 1 bit.

In the information transmitting method provided by an embodiment of the present invention, the reconfiguration of the SA resource block implements the transmission requirements of unicast single subcarrier for the D2D transmitting technology in the NB-IoT system, and the unicast transmission manner used in the information transmitting method in the embodiments of the present invention further reduces power consumption and improves resource utilization efficiency.

Figure 6:
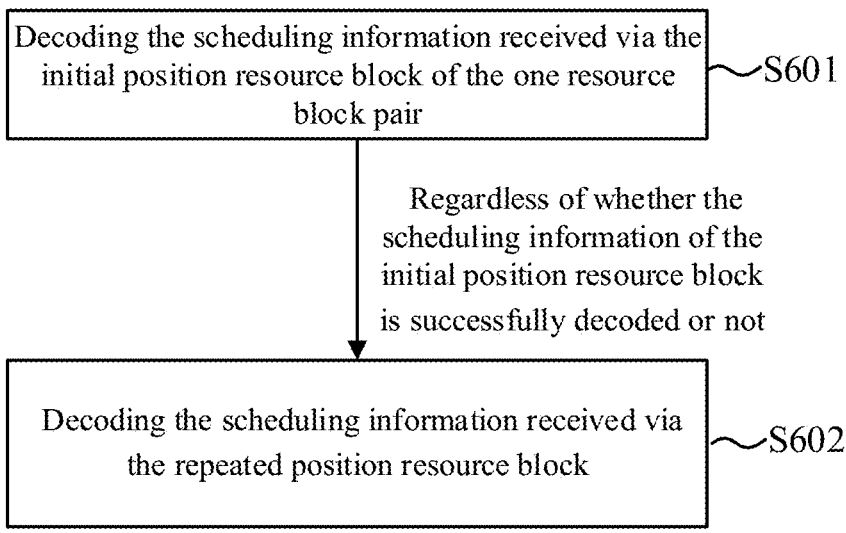
FIG. 6 shows a flow chart of an information receiving method according to an embodiment of the present invention.

FIG. 6 is a flow chart showing an information receiving method performed by a receiving device according to an embodiment of the present invention when the receiving device cannot determine the information transmitting manner of a transmitting device. The receiving device receives scheduling information transmitted by the transmitting device by using resource block in a resource pool that includes a plurality of resource blocks, and the scheduling information is transmitted via one resource block or resource block pair of the plurality of resource blocks, in which the resource block pair includes an initial position resource block and a repeated position resource block.

As shown in FIG. 6, an information receiving method 600 includes step S601: decoding the scheduling information received via the initial position resource block of the one resource block pair.

When the receiving device receives the scheduling information transmitted by the transmitting device, but cannot determine the information transmitting manner of the transmitting device, then regardless of whether the information transmitting manner of the transmitting device is unicast, multicast, or broadcast, the initial position resource block in the one resource block pair is required to be decoded.

Then, in step S602, regardless of whether the scheduling information of the initial position resource block is successfully decoded or not, the scheduling information received via the repeated position resource block is decoded.

In the prior art, regardless of whether the information transmitting manner is multicast or broadcast, the scheduling information is repeatedly transmitted by two resource blocks in one resource block pair. Therefore, in the decoding process of the prior art, if the initial position resource block of the resource block pair is successfully decoded, the information transmitted by the repeated position resource block is the same as the initial position resource block by default, and there is no need to decode the repeated position resource block.

However, in the embodiments of the present invention, since the information transmitting manner has the possibility of unicast, two resource blocks corresponding to one resource block pair may carry information transmitted from different transmitting devices to different receiving devices. Thus, regardless of whether the scheduling information of the initial position resource block is successfully decoded or not, the repeated position resource block in the resource block pair needs to be decoded in the embodiments of the present invention. The entire scheduling information can be obtained only when the decoding of the initial position resource block and the repeated position resource block in one resource block pair is completed.

In addition, in the embodiments of the present invention, if decoding of the initial position resource block and the repeated position resource block in one resource block pair both fails, the scheduling information of the initial position resource block and the repeated position resource block may be combined and decoded again.

In the information receiving method provided by an embodiment of the present invention, the receiving device can decode the received information in case that the receiving device is not able to determine the information transmitting manner of the transmitting device, which satisfies the information receiving requirements and the decoding requirements in various information transmitting manners (such as unicast, multicast or broadcast) in the NB-IoT system.

Figure 7:
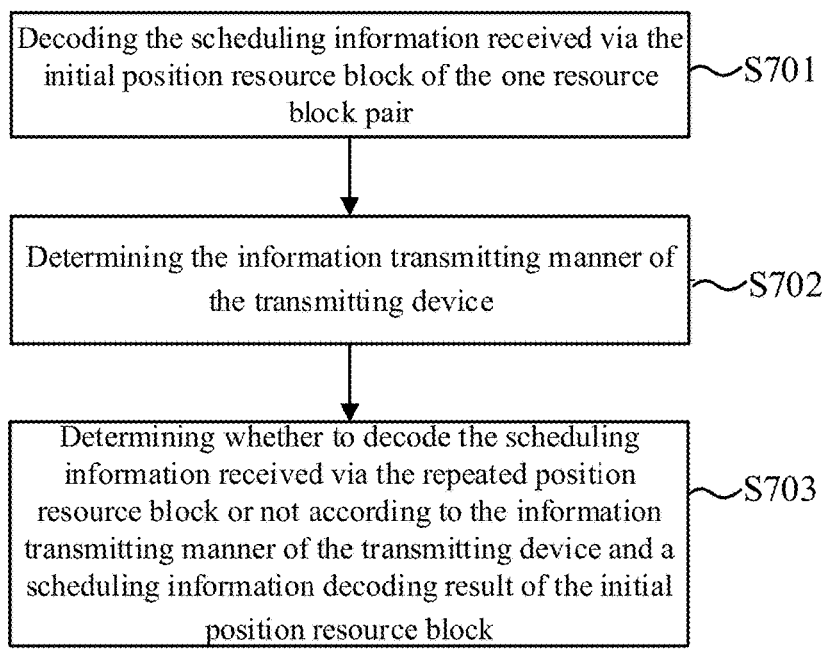
FIG. 7 shows a flow chart of an information receiving method according to an embodiment of the present invention.

FIG. 7 is a flow chart showing an information receiving method performed by a receiving device in an embodiment of the present invention when the receiving device is capable of determining the information transmitting manner of a transmitting device. The receiving device receives scheduling information transmitted by the transmitting device by using resource block in a resource pool, the resource pool includes a plurality of resource blocks, and the scheduling information is transmitted via one resource block or resource block pair of the plurality of resource blocks in which the resource block pair includes an initial position resource block and a repeated position resource block.

As shown in FIG. 7, an information receiving method 700 includes step S701: decoding the scheduling information received via the initial position resource block of the one resource block pair.

In this step, regardless of whether the information transmitting manner of the transmitting device is unicast, multicast, or broadcast, the initial position resource block in the one resource block pair is required to be decoded.

Subsequently, in step S702, the information transmitting manner of the transmitting device is determined. In an embodiment of the present invention, the information transmitting manner may be determined by indication information (indicating the information transmitting manner) in SA contents acquired after decoding the initial position resource block in step S701. In another embodiment of the present invention, it may be determined by a transmitting manner identifier (ID) (indicating the information transmitting manner) in the SA contents acquired after decoding the initial position resource block in step S701, in combination with the information transmitting manner corresponding to this ID.

In step S703, it is determined whether to decode the scheduling information received via the repeated position resource block or not according to the information transmitting manner of the transmitting device and a scheduling information decoding result of the initial position resource block. Specifically, when the scheduling information of the initial position resource block is successfully decoded and the information transmitting manner of the transmitting device is multicast or broadcast, it means that the information transmitted via the repeated position resource block is the same as the initial position resource block, and there is no need to decode the repeated position resource block.

When the scheduling information of the initial position resource block is successfully decoded and the information transmitting manner of the transmitting device is unicast, although the receiving device has been capable of obtaining the scheduling information of the initial position resource block, the scheduling information carried on the initial position resource block and the repeated position resource block of one resource block pair may be different when the information transmitting manner is unicast, and thus the repeated position resource block still needs to be decoded.

When the scheduling information of the initial position resource block fails to be decoded, regardless of whether the information transmitting manner of the transmitting device is unicast, multicast, or broadcast, the scheduling information received via the repeated position resource block needs to be decoded.

In addition, in the embodiments of the present invention, if decoding of the initial position resource block and the repeated position resource block in one resource block pair both fails, the scheduling information of the initial position resource block and the repeated position resource block may be combined and decoded again.

In the information receiving method provided by an embodiment of the present invention, the receiving device can decode the received information when knowing the information transmitting manner of the transmitting device, which saves system resources, and satisfies the information receiving requirements and the decoding requirements in various information transmitting manners (such as unicast, multicast or broadcast) in the NB-IoT system.

Figure 8:
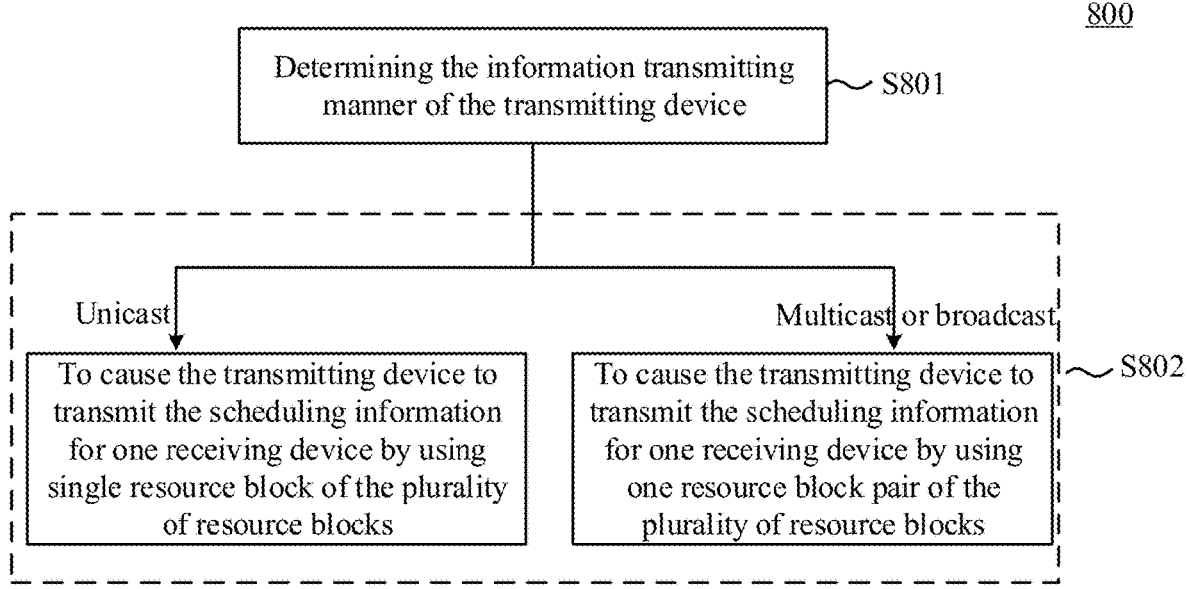
FIG. 8 shows a flow chart of an information transmitting control method according to another embodiment of the present invention.

FIG. 8 is a flow chart showing an information transmitting control method performed by a base station according to an embodiment of the present invention. The method is used for controlling a transmitting device to transmit information by using resource blocks in a resource pool, the resource pool includes a plurality of resource blocks.

As shown in FIG. 8, an information transmitting control method 800 includes step S801: determining the information transmitting manner of the transmitting device. Wherein, in an embodiment of the present invention, the base station determines that the information transmitting manner of the transmitting device can be directly determined. In another embodiment of the present invention, the base station may determine the information transmitting manner of the transmitting device via the received scheduling request (including the information transmitting manner of the transmitting device) transmitted by the transmitting device. For example, the scheduling request transmitted from the transmitting device to the base station includes information indicating the information transmitting manner is unicast, and then the base station may determine the information transmitting manner of the transmitting device to be unicast based on this scheduling request.

In step S802, the base station indicates the transmitting device to transmit scheduling information according to the determined information transmitting manner, in order to cause the transmitting device to transmit the scheduling information for one unicast transmission by using single resource block of the plurality of resource blocks when the information transmitting manner is unicast, or to cause the transmitting device to transmit the scheduling information for one multicast or broadcast transmission by using one resource block pair of the plurality of resource blocks when the information transmitting manner is multicast or broadcast.

In an embodiment of the present invention, indicating the transmitting device to transmit the scheduling information according to the determined information transmitting manner may include: transmitting configuration information for the information transmitting manner to the transmitting device, so that the transmitting device determines the information transmitting manner according to the configuration information. For example, the base station may first transmit a semi-static configuration of a unicast transmitting manner to the transmitting device, so that the transmitting device transmits information to the receiving device by using the unicast transmitting manner for a period of time thereafter. In another embodiment of the present invention, the base station may transmit D2D authorization information to the transmitting device so as to authorize the transmitting device to transmit information via D2D to the receiving device, where the authorization information may include a 1-bit indication information indicating the information transmitting manner of the transmitting device. In still another embodiment of the present invention, the base station may further cause the transmitting device to determine its information transmitting manner implicitly. Specifically, the base station transmits the D2D authorization information, which includes receiving device information indicating the receiving device, to the transmitting device, so that the transmitting device determines its information transmitting manner according to the receiving device information in combination with the pre-stored information receiving manner corresponding to the receiving device. For example, when the receiving device indicated by the receiving device information transmitted from the base station corresponds to a unicast receiving manner, the transmitting device may be able to determine its information transmitting manner to be a unicast transmitting.

In this step, when the base station indicates the information transmitting manner of the transmitting device as multicast or broadcast, the transmitting device may repeatedly transmit the scheduling information to the same receiving device by using a SA resource block pair in the resource pool by referring to the SA configuration shown in FIG. 2 to avoid the HD problem. When the information transmitting manner of the transmitting device indicated by the base station is unicast, the transmitting device does not need to repeatedly transmit the scheduling information by using a resource block pair, but to transmit the scheduling information for one unicast transmission on single SA resource block.

In the embodiments of the present invention, in order to avoid the HD problem, when the information transmitting manner indicated by the base station is unicast, the base station will configure a time occupied by the resource blocks used for transmitting information by the transmitting device to be different from a time occupied by the resource blocks used for receiving unicast information by the receiving device.

Here, in order to reuse a resource pool structure in a D2D transmission and adapt to a unicast information transmission manner in the NB-IoT system, the base station may reconfigure the format of a SA resource block before information transmissions. Specifically, in the embodiments of the present invention, the SA resource block may be configured to have a fixed bandwidth of single carrier width (15 kHz or 3.75 kHz) in frequency domain, and preferably 15 kHz which causes less HD problem, to adapt to the transmission capability of single carrier UE. In time domain, the base station may configure the SA resource block to have a preset fixed time slot bundling length, such as X*8 ms or X*32 ms, to accommodate the content of SA, where X is a fixed value.

In the information transmitting control method provided by an embodiment of the present invention, the base station first determines the information transmitting manner of the transmitting device, and indicates the transmitting device to transmit the scheduling information to the receiving device by using the information transmitting manner, so that the transmission requirements of a unicast single subcarrier in the NB-IoT system can be satisfied in the D2D transmitting transmission process.

Figure 9:
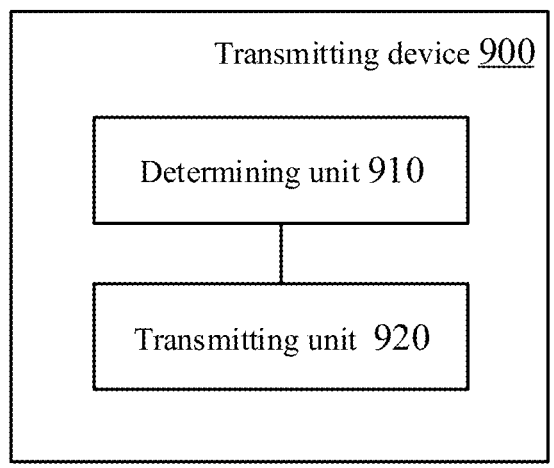
FIG. 9 shows a block diagram of a transmitting device according to an embodiment of the present invention.

Next, a transmitting device according to an embodiment of the present invention will be described with reference to FIG. 9. FIG. 9 shows a block diagram of a transmitting device 900 in accordance with an embodiment of the present invention. As shown in FIG. 9, the transmitting device 900 includes a determining unit 910 and a transmitting unit 920. In addition to these two units, the transmitting device 900 may include other components, however, since these components are not related to the content of the embodiments of the present invention, the illustration and description thereof are omitted herein. Further, since the specific details of the operations described below performed by the transmitting device 900 according to the embodiment of the present invention are the same as those described above with reference to FIGS. 4-5, the repeated description of the same details is omitted herein to avoid repetition.

The transmitting device 900 in FIG. 9 transmits information to a receiving device by using resource blocks in a resource pool, the resource pool includes a plurality of resource blocks. According to the embodiment of the present invention, when the transmitting device transmits information, the transmitting device 900 first needs to determine whether its information transmitting manner is unicast, multicast or broadcast according to an indication of a base station, and then transmits information according to the determined information transmitting manner.

Wherein, the determining unit 910 is configured to determine the information transmitting manner. The information transmitting manner of the transmitting device 900 is indicated by the base station, and the information transmitting manner may include unicast, multicast, and broadcast. According to an example of the present invention, the base station can directly designate the information transmitting manner of the transmitting device by transmitting an indication; according to another example of the present invention, the transmitting device 900 may include a scheduling request unit (not shown), which first transmits a Scheduling Request (SR) containing the information transmitting manner of the transmitting device to the base station, and then the base station may indicate the information transmitting manner of the transmitting device according to the SR. For example, when the information transmitting manner of the transmitting device 900 is unicast, the SR transmitted from the scheduling request unit to the base station may include information on which its information transmitting manner is unicast, so that the base station indicates the transmitting device 900 to transmit scheduling information to the receiving device in a unicast manner.

The determining unit 910 can determine the information transmitting manner in various ways. In an embodiment of the present invention, the base station may first transmit configuration information for the information transmitting manner to the transmitting device, so that the determining unit 910 determines the information transmitting manner according to this configuration information. For example, the base station may first transmit a semi-static configuration of a unicast transmitting manner to the transmitting device, so that the determining unit 910 determines that the unicast transmitting manner needs to be used for transmitting information to the receiving device for a period of time thereafter. In another embodiment of the present invention, the base station may transmit D2D authorization information to the transmitting device 900 so as to authorize the transmitting device to transmit information via D2D to the receiving device, where the authorization information may include a 1-bit indication information indicating the information transmitting manner of the transmitting device. The determining unit 910 can determine the information transmitting manner via the received authorization information of the base station. In still another embodiment of the present invention, the determining unit 910 may further determine the information transmitting manner of the transmitting device 900 implicitly. Specifically, the determining unit 910 may determine the information transmitting manner of the transmitting device 900 through the receiving device information indicating the receiving device in the received base station D2D authorization information, in combination with the pre-stored information receiving manner corresponding to the receiving device. For example, when the receiving device indicated by the receiving device information received by the determining unit 910 corresponds to a unicast receiving manner, the determining unit 910 can determine the information transmitting manner of the transmitting device 900 as a unicast transmitting manner.

The transmitting unit 920 is configured to transmit the scheduling information for one receiving device by using one of the plurality of resource blocks when the information transmitting manner is unicast; and to transmit the scheduling information for one multicast or broadcast transmission by using a resource block pair of the plurality of resource blocks when the information transmitting manner is multicast or broadcast.

When the information transmitting manner of the transmitting device is multicast or broadcast, the transmitting unit 920 can repeatedly transmit the scheduling information to the same receiving device by using a SA resource block pair in a resource pool by referring to the SA configuration shown in FIG. 2. When the information transmitting manner of the transmitting device is unicast, the transmitting unit 920 does not need to repeatedly transmit the scheduling information by using a resource block pair, but to transmit the scheduling information for one receiving device on single SA resource block as shown in FIG. 5.

Here, in order to reuse a resource pool structure in a D2D transmission and adapt to a unicast information transmission manner in the NB-IoT system, the format of a SA resource block needs to be reconfigured by the base station or a preset protocol before the information transmissions. Specifically, the SA resource block in an embodiment of the present invention may have a fixed bandwidth of a single carrier width (15 kHz or 3.75 kHz) in frequency domain, and preferably 15 kHz which causes less HD problem, to adapt to the transmission capability of a single carrier UE. In time domain, the SA resource block may have a preset fixed time slot length, such as X*8 ms or X*32 ms, to accommodate the content of SA, where X is a fixed value.

Wherein, in an embodiment of the present invention, the scheduling information transmitted by the transmitting device may include indication information indicating the information transmitting manner, so that the receiving device can acquire the information transmitting manner of the transmitting device according to the indication information. Alternatively, the indication information may occupy 1 bit.

In the information transmitting device provided by an embodiment of the present invention, the reconfiguration of the SA resource block implements the transmission requirements of unicast single subcarrier for the D2D transmitting technology in the NB-IoT system, and the unicast transmission manner used in the information transmitting method in the embodiments of the present invention further reduces power consumption and improves resource utilization efficiency.

Figure 10:
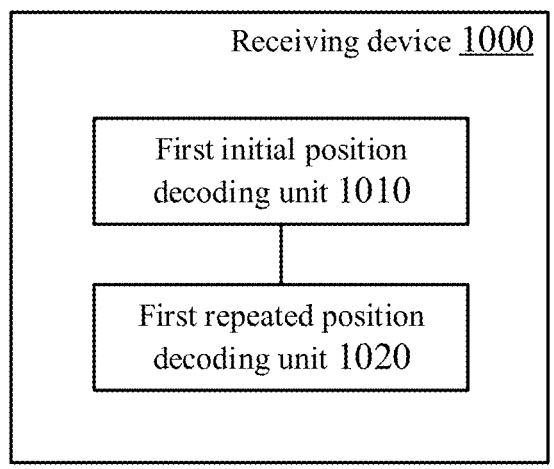
FIG. 10 shows a block diagram of a receiving device according to an embodiment of the present invention.

Next, a receiving device according to an embodiment of the present invention will be described with reference to FIG. 10. FIG. 10 shows a block diagram of a receiving device 1000 in accordance with an embodiment of the present invention. As shown in FIG. 10, the receiving device 1000 includes a first initial position decoding unit 1010 and a first repeated position decoding unit 1020. In addition to these two units, the receiving device 1000 may include other components, however, since these components are not related to the content of the embodiments of the present invention, the illustration and description thereof are omitted herein. Further, since the specific details of the operations described below performed by the receiving device 1000 according to the embodiment of the present invention are the same as those described above with reference to FIG. 6, the repeated description of the same details is omitted herein to avoid repetition.

The receiving device 1000 receives scheduling information transmitted by a transmitting device by using resource block in a resource pool, the resource pool includes a plurality of resource blocks, the scheduling information is transmitted via one resource block or resource block pair of the plurality of resource blocks, where the resource block pair includes an initial position resource block and a repeated position resource block.

The first initial position decoding unit 1010 in the receiving device 1000 is configured to decode the scheduling information received via the initial position resource block of the one resource block pair. When the receiving device 1000 receives the scheduling information transmitted by the transmitting device, but cannot determine the information transmitting manner of the transmitting device, then regardless of whether the information transmitting manner of the transmitting device is unicast, multicast, or broadcast, the first initial position decoding unit 1010 is required to decode the initial position resource block in the one resource block pair.

The first repeated position decoding unit 1020 is configured to decode the scheduling information received via the repeated position resource block regardless of whether the scheduling information of the initial position resource block is successfully decoded or not.

In the prior art, regardless of whether the information transmitting manner is multicast or broadcast, the scheduling information is repeatedly transmitted by two resource blocks in one resource block pair. Therefore, in the decoding process of the prior art, if the initial position resource block of the resource block pair is successfully decoded, the information transmitted by the repeated position resource block is the same as the initial position resource block by default, and there is no need to decode the repeated position resource block.

However, in the embodiments of the present invention, since the information transmitting manner has the possibility of unicast, two resource blocks corresponding to one resource block pair may carry information transmitted from different transmitting devices to different receiving devices. Thus, regardless of whether the scheduling information of the initial position resource block is successfully decoded or not, the first repeated position decoding unit 1020 is required to decode the repeated position resource block in the resource block pair in the embodiments of the present invention. The entire scheduling information can be obtained only when the decoding of the initial position resource block and the repeated position resource block in one resource block pair is completed.

In addition, in the embodiments of the present invention, a first combined decoding unit (not shown) may further be included, which is configured to combine and decode the scheduling information of the initial position resource block and the repeated position resource block again if decoding of the initial position resource block and the repeated position resource block in one resource block pair both fails.

In the receiving device provided by an embodiment of the present invention, the receiving device can decode the received information without being able to determine the information transmitting manner of the transmitting device, which satisfies the information receiving requirements and the decoding requirements of various information transmitting manners (such as unicast, multicast or broadcast) in the NB-IoT system.

Figure 11:
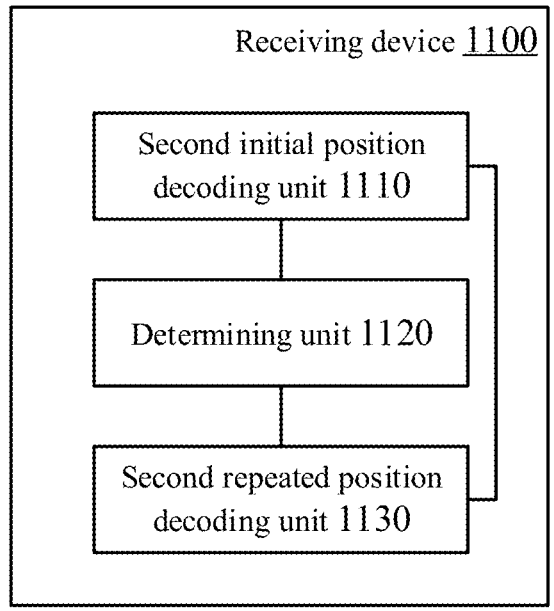
FIG. 11 shows a block diagram of a receiving device according to another embodiment of the present invention.

Next, a receiving device according to an embodiment of the present invention will be described with reference to FIG. 11. FIG. 11 shows a block diagram of a receiving device 1100 in accordance with an embodiment of the present invention. As shown in FIG. 11, the receiving device 1100 includes a second initial position decoding unit 1110, a determining unit 1120 and a second repeated position decoding unit 1130. In addition to these three units, the receiving device 1100 may include other components, however, since these components are not related to the content of the embodiments of the present invention, the illustration and description thereof are omitted herein. Further, since the specific details of the operations described below performed by the receiving device 1100 according to the embodiment of the present invention are the same as those described above with reference to FIG. 7, the repeated description of the same details is omitted herein to avoid repetition.

The receiving device 1100 receives scheduling information transmitted by a transmitting device by using resource block in a resource pool, the resource pool includes a plurality of resource blocks, the scheduling information is transmitted via one resource block or resource block pair of the plurality of resource blocks, where the resource block pair includes an initial position resource block and a repeated position resource block.

The second initial position decoding unit 1110 in the receiving device 1100 is configured to decode the scheduling information received via the initial position resource block of the one resource block pair. Wherein, regardless of whether the information transmitting manner of the transmitting device is unicast, multicast, or broadcast, the initial position resource block in the one resource block pair is required to be decoded first.

The determining unit 1120 is configured to determine the information transmitting manner of the transmitting device. In an embodiment of the present invention, the information transmitting manner may be determined by indication information (indicating the information transmitting manner) in SA contents acquired after decoding the initial position resource block by the second initial position decoding unit 1110. In another embodiment of the present invention, it may be determined by a transmitting manner identifier (ID, which indicates the information transmitting manner) in the SA contents acquired after decoding the initial position resource block by the second initial position decoding unit 1110, in combination with the information transmitting manner corresponding to this ID.

The second repeated position decoding unit 1130 determines whether to decode the scheduling information received via the repeated position resource block or not according to the information transmitting manner of the transmitting device and a scheduling information decoding result of the initial position resource block. Specifically, when the scheduling information of the initial position resource block is successfully decoded and the information transmitting manner of the transmitting device is multicast or broadcast, it means that the information transmitted by the repeated position resource block is the same as the initial position resource block, and there is no need to decode the repeated position resource block.

When the scheduling information of the initial position resource block is successfully decoded and the information transmitting manner of the transmitting device is unicast, although the receiving device has been capable of obtaining the scheduling information of the initial position resource block, the scheduling information carried on the initial position resource block and the repeated position resource block of one resource block pair may be different when the information transmitting manner is unicast, and then the repeated position resource block still needs to be decoded.

When the scheduling information of the initial position resource block fails to be decoded, regardless of whether the information transmitting manner of the transmitting device is unicast, multicast, or broadcast, the scheduling information received via the repeated position resource block needs to be decoded.

In addition, in the embodiments of the present invention, the receiving device may further include a second combined decoding unit, which is configured to combine and decode the scheduling information of the initial position resource block and the repeated position resource block again if decoding of the initial position resource block and the repeated position resource block in one resource block pair both fails.

In the receiving device provided by an embodiment of the present invention, the receiving device can decode the received information with acquiring the information transmitting manner of the transmitting device, which saves system resources, and satisfies the information receiving requirements and the decoding requirements of various information transmitting manners (such as unicast, multicast or broadcast) in the NB-IoT system.

Figure 12:
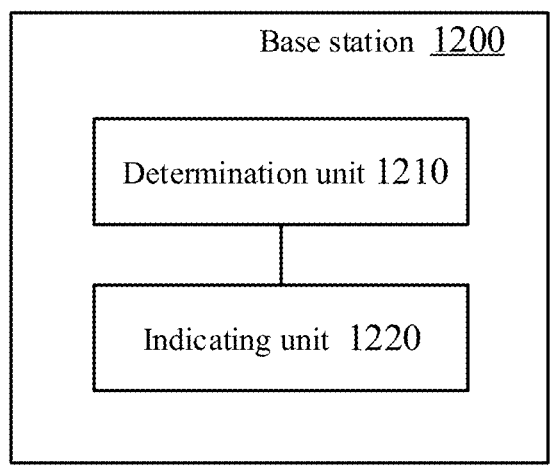
FIG. 12 shows a block diagram of a base station according to an embodiment of the present invention.

Next, a base station according to an embodiment of the present invention will be described with reference to FIG. 12. FIG. 12 shows a block diagram of a base station 1200 in accordance with an embodiment of the present invention. As shown in FIG. 12, the base station 1200 includes a determination unit 1210 and an indicating unit 1220. In addition to these two units, the base station 1200 may include other components, however, since these components are not related to the content of the embodiments of the present invention, the illustration and description thereof are omitted herein. Further, since the specific details of the operations described below performed by the base station 1200 according to the embodiment of the present invention are the same as those described above with reference to FIG. 8, the repeated description of the same details is omitted herein to avoid repetition.

The base station 1200 according to the embodiment of the present invention is used for controlling a transmitting device to transmit information by using resource block in a resource pool, the resource pool includes a plurality of resource blocks.

Wherein, the determination unit 1210 is configured to determine the information transmitting manner of the transmitting device. In an embodiment of the present invention, the determination unit 1210 determines that the information transmitting manner of the transmitting device can be directly determined. In another embodiment of the present invention, the base station 1200 may further include a receiving unit (not shown), the determination unit 1210 may determine the information transmitting manner of the transmitting device via the scheduling request received by the receiving unit and transmitted by the transmitting device, wherein the scheduling request includes the information transmitting manner of the transmitting device. For example, the scheduling request transmitted from the transmitting device to the base station includes its information transmitting manner being unicast, and then the determination unit 1210 may determine the information transmitting manner of the transmitting device to be unicast based on this scheduling request.

The indicating unit 1220 is configured to indicate the transmitting device to transmit scheduling information according to the determined information transmitting manner, in order to cause the transmitting device to transmit the scheduling information for one unicast transmission by using single resource block of the plurality of resource blocks when the information transmitting manner is unicast; or to cause the transmitting device to transmit the scheduling information for one multicast or broadcast transmission by using one resource block pair of the plurality of resource blocks when the information transmitting manner is multicast or broadcast.

Wherein, in an embodiment of the present invention, the indicating unit 1220 may transmit configuration information for the information transmitting manner to the transmitting device, so that the transmitting device determines the information transmitting manner according to the configuration information. For example, the indicating unit 1220 may first transmit a semi-static configuration of a unicast transmitting manner to the transmitting device, so that the transmitting device transmits information to the receiving device by using the unicast transmitting manner for a period of time thereafter. In another embodiment of the present invention, the indicating unit 1220 may transmit D2D authorization information to the transmitting device so as to authorize the transmitting device to transmit information via D2D to the receiving device, where the authorization information may include a 1-bit indication information indicating the information transmitting manner of the transmitting device. In still another embodiment of the present invention, the indicating unit 1220 may further cause the transmitting device to determine its information transmitting manner implicitly. Specifically, the indicating unit 1220 transmits the D2D authorization information, which includes receiving device information indicating the receiving device, to the transmitting device, so that the transmitting device determines its information transmitting manner according to the receiving device information in combination with the pre-stored information receiving manner corresponding to the receiving device. For example, when the receiving device indicated by the receiving device information transmitted from the indicating unit 1220 corresponds to a unicast receiving manner, the transmitting device may be able to determine its information transmitting manner to be a unicast transmitting.

When the indicating unit 1220 indicates the information transmitting manner of the transmitting device as multicast or broadcast, the transmitting device may repeatedly transmit the scheduling information to the same receiving device by using a SA resource block pair in the resource pool by referring to the SA configuration shown in FIG. 2 to avoid the HD problem. When the information transmitting manner of the transmitting device indicated by the indicating unit 1220 is unicast, the transmitting device does not need to repeatedly transmit the scheduling information by using a resource block pair, but to transmit the scheduling information for one unicast transmission on single SA resource block as shown in FIG. 5.

In an embodiment of the present patent, the base station 1200 may further include a configuration unit (not shown). To avoid the HD problem, the configuration unit is configured to configure time occupied by the resource blocks used for transmitting information by the transmitting device to be different from time occupied by the resource blocks used for receiving unicast information by the receiving device when the information transmitting manner indicated by the indicating unit 1220 is unicast.

Here, in order to reuse a resource pool structure in a D2D transmission and adapt to a unicast information transmission manner in the NB-IoT system, the format of a SA resource block may be refigured before information transmissions. Specifically, in the embodiments of the present invention, the SA resource block may be configured to have a fixed bandwidth of single carrier width (15 kHz or 3.75 kHz) in frequency domain, and preferably 15 kHz which causes less HD problems, to adapt to the transmission capability of a single carrier UE. In time domain, the base station may configure the SA resource block to have a preset fixed time slot bundling length, such as X*8 ms or X*32 ms, to accommodate the content of SA, where X is a fixed value.

In the base station provided by an embodiment of the present invention, the information transmitting manner of the transmitting device is first determined, and indicates the transmitting device to transmit the scheduling information to the receiving device by using the information transmitting manner, so that the unicast narrowband transmission requirements in the NB-IoT system can be satisfied in the D2D transmitting transmission process.

The operations of the transmitting device 900, the receiving device 1000, 1100 and the base station 1200 can be implemented by hardware or by a software module executed by a processor, and can be further implemented by the combination of the above two.

The software module may be arranged in a storage medium in any format, such as a RAM (Random Access Memory), a flash memory, a ROM (Read Only Memory), an EPROM (Erasable Programmable ROM), an EEPROM (Electrically Erasable Programmable ROM), a register, a hard disk, a removable disk, and a CD-ROM.

Such storage medium is connected to the processor so that the processor can write information into the storage medium or read information from the storage medium. Such storage medium can also be accumulated in the processor. Such storage medium and processor may be arranged in an ASIC. Such ASIC may be arranged in the transmitting device 900, the receiving device 1000, 1100 and the base station 1200. As discrete components, such storage medium and processor may be arranged in the transmitting device 900, the receiving device 1000, 1100 and the base station 1200.

Therefore, the present invention has been explained in detail by using the above embodiments; however, it is apparent for those skilled in the art that the present invention is not limited to the embodiments explained herein. The invention may be implemented in a corrected, modified mode without departing from the scope of the invention defined by the claims. Therefore, the description of the specification is only intended to explain the examples, and does not impose any limit on the present invention.

The invention claimed is:

1. A transmitting device for transmitting information to a receiving device by using resource block in a resource pool, the resource pool includes a plurality of resource blocks, wherein the transmitting device includes:
    a processor;
    a storage, a computer program instruction stored on the storage,
    wherein, when the computer program instruction is executed by the processor, causes the processor to perform steps of:
    determining an information transmitting manner; and
    transmitting scheduling information for one unicast transmission by using single resource block of the plurality of resource blocks when the information transmitting manner is unicast; transmitting scheduling information for one multicast or broadcast transmission by using a resource block pair of the plurality of resource blocks when the information transmitting manner is multicast or broadcast,
    wherein, for different information transmitting manners, used scheduling assignment (SA) resource block allocation manners are different, and
    wherein the resource block pair is composed of a first resource block of the plurality of resource blocks in an upper part of the resource pool and a second resource block of the plurality of resource blocks in a lower part of the resource pool.

2. The transmitting device according to claim 1, wherein, the processor receives configuration information from a base station for the information transmitting manner, and determines the information transmitting manner according to the configuration information.

3. The transmitting device according to claim 1, wherein, the processor receives authorization information from a base station, wherein the authorization information includes indication information indicating the information transmitting manner, and determining the information transmitting manner according to the indication information.

4. The transmitting device according to claim 1, wherein, the processor receives authorization information from a base station, the authorization information includes receiving device information indicating the receiving device, and determines the information transmitting manner according to the receiving device information and a pre-stored information receiving manner corresponding to the receiving device.

5. The transmitting device according to claim 1, wherein a format of the scheduling information is configured to:
have a bandwidth of single carrier in frequency domain, and have a preset fixed time slot length in time domain.

6. The transmitting device according to claim 1, wherein the scheduling information transmitted by the transmitting device includes:
indication information indicating the information transmitting manner.

* * * * *